(12) United States Patent
Tabata et al.

(10) Patent No.: US 9,199,638 B2
(45) Date of Patent: Dec. 1, 2015

(54) CONTROL DEVICE FOR VEHICLE DRIVE DEVICE

(75) Inventors: Atsushi Tabata, Okazaki (JP); Tooru Matsubara, Toyota (JP); Tatsuya Imamura, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/358,823

(22) PCT Filed: Nov. 18, 2011

(86) PCT No.: PCT/JP2011/076726
§ 371 (c)(1),
(2), (4) Date: May 16, 2014

(87) PCT Pub. No.: WO2013/073058
PCT Pub. Date: May 23, 2013

(65) Prior Publication Data
US 2014/0324263 A1    Oct. 30, 2014

(51) Int. Cl.
*B60L 11/00* (2006.01)
*B60W 20/00* (2006.01)
(Continued)

(52) U.S. Cl.
CPC ............... *B60W 20/40* (2013.01); *B60K 6/442* (2013.01); *B60K 6/48* (2013.01); *B60K 6/485* (2013.01); *B60W 10/026* (2013.01); *B60W 10/08* (2013.01); *B60K 2006/4825* (2013.01); *B60Y 2400/426* (2013.01); *Y02T 10/6221* (2013.01); *Y02T 10/6226* (2013.01); *Y02T 10/6234* (2013.01); *Y02T 10/6252* (2013.01); *Y10S 903/93* (2013.01)

(58) Field of Classification Search
CPC ... B60W 10/026; B60W 10/08; B60W 20/40; B60K 2006/4825; B60K 1/02; B60K 6/48; B60K 6/442; B60K 6/485; Y02T 10/6226; Y02T 10/7258; Y02T 10/6252
USPC ............ 701/22, 102, 113; 477/3, 5, 7, 20, 99; 475/4, 5; 180/65.265, 65.28, 65.285; 903/946
See application file for complete search history.

(56) References Cited

U.S. PATENT DOCUMENTS

| | | | |
|---|---|---|---|
| 6,317,665 B1 | 11/2001 | Tabata et al. | |
| 2008/0234885 A1* | 9/2008 | Suzuki | ............................ 701/22 |
| 2009/0017984 A1* | 1/2009 | Shibata et al. | .................... 477/3 |

FOREIGN PATENT DOCUMENTS

| | | |
|---|---|---|
| JP | 2000-120858 A | 4/2000 |
| JP | 2000-220557 A | 8/2000 |

*Primary Examiner* — Gertrude Arthur Jeanglaude
(74) *Attorney, Agent, or Firm* — Kenyon & Kenyon LLP

(57) ABSTRACT

A control apparatus for a vehicular drive system is provided with: a fluid-operated power transmitting device having an input rotary member configured to receive a drive force from an engine, an output rotary member from which the drive force is transmitted to drive wheels, and a lock-up clutch configured to mechanically connect the input rotary member and the output rotary member to each other; a first electric motor connected directly or indirectly to said input rotary member; and a second electric motor connected directly or indirectly to a power transmitting path between said fluid-operated power transmitting path and said drive wheels, the control apparatus comprising: a hybrid control portion configured to control said first electric motor and said second electric motor to generate an engine starting torque for starting said engine while a power transmitting path between said second electric motor and said drive wheels is placed in a power cutoff state or a restricted power transmitting state and while said lock-up clutch is given a torque capacity.

5 Claims, 12 Drawing Sheets

(51) Int. Cl.
*B60K 6/442* (2007.10)
*B60K 6/48* (2007.10)
*B60K 6/485* (2007.10)
*B60W 10/02* (2006.01)
*B60W 10/08* (2006.01)

|     | C1 | C2 | B1 | B2 | B3 |
|-----|----|----|----|----|----|
| 1st | O  |    |    | O  |    |
| 2nd | O  |    | O  |    |    |
| 3rd | O  |    |    |    | O  |
| 4th | O  | O  |    |    |    |
| 5th |    | O  |    |    | O  |
| 6th |    | O  | O  |    |    |
| R   |    |    |    | O  | O  |
| N   |    |    |    |    |    |

O ENGAGED

CONTROL DEVICE FOR VEHICLE DRIVE DEVICE

CROSS-REFERENCE TO RELATED APPLICATIONS

This is a national phase application based on the PCT International Patent Application No. PCT/JP2011/076726 filed Nov. 18, 2011, the entire contents of which are incorporated herein by reference.

TECHNICAL FIELD

The present invention relates to a control apparatus for a vehicular drive system provided with an engine, electric motors and a fluid-operated power transmitting device, and more particularly to techniques for controlling starting of the engine.

BACKGROUND ART

There is well known a vehicle provided with a fluid-operated power transmitting device having a lock-up clutch, and a vehicle drive electric motor functioning as a vehicle drive power source. The power transmitting device has an input rotary member configured to receive a drive force from an engine, and an output rotary member from which the drive force is transmitted to drive wheels. The lock-up clutch mechanically connects the input rotary member and the output rotary member to each other. Patent Document 1 discloses an example of such a vehicle. The vehicle disclosed in this Patent Document 1 is further provided with an electric motor for operating an optionally provided device during stopping of the engine, in addition to the vehicle drive electric motor.

PRIOR ART DOCUMENT

Patent Document

Patent Document 1: JP-2000-120858 A

SUMMARY OF THE INVENTION

Object Achieved by the Invention

By the way, the vehicle disclosed in Patent Document 1 is configured to start the engine, by using the electric motor provided in addition to the vehicle drive electric motor. Namely, this electric motor used to start the engine functions as the electric motor for operating the optionally provided device, and as an engine starter for starting the engine. Accordingly, the vehicle is required to be provided with the engine starter electric motor which is able to generate a torque large enough to permit adequate starting of the engine. It is noted in particular that the torque required for cranking of the engine in a cold state is relatively large, so that the vehicle is required to be provided with the engine starter electric motor able to generate the relatively large torque for starting the engine in the cold state. It is noted that this requirement is not publicly known, and that no techniques have been proposed to make it possible to prevent an increase of the required size of each of the two electric motors disposed on respective upstream and downstream sides of the fluid-operated power transmitting device of a vehicular drive system, which is provided with the lock-up clutch.

The present invention was made in view of the background art described above. It is therefore an object of the present invention to provide a control apparatus for a vehicular drive system, which makes it possible to prevent an increase of the required sizes of electric motors used to start an engine.

Means for Achieving the Object

The object indicated above is achieved according to a first form of the present invention, which provides a control apparatus for (a) a vehicular drive system provided with: a fluid-operated power transmitting device having an input rotary member configured to receive a drive force from an engine, an output rotary member from which the drive force is transmitted to drive wheels, and a lock-up clutch configured to mechanically connect the input rotary member and the output rotary member to each other; a first electric motor connected directly or indirectly to the input rotary member; and a second electric motor connected directly or indirectly to a power transmitting path between the fluid-operated power transmitting device and the drive wheels, (b) the control apparatus being characterized in that the above-described first electric motor and the above-described second electric motor are controlled to generate an engine starting torque for starting the above-described engine while the power transmitting path between the above-described second electric motor and the above-described drive wheel is placed in a power cutoff state or a restricted power transmitting state and while the above-described lock-up clutch is given a torque capacity.

Advantages of the Invention

The control apparatus described above is configured to permit the engine to be started by the above-described first electric motor and the above-described second electric motor, that is, to use both of the first and second electric motors to generate the engine starting torque for starting the engine, so that the required size of each of the two electric motors can be made smaller than where only one electric motor is used to start the engine. Thus, it is not necessary to increase the size of each of the two electric motors, namely, it is possible to prevent an increase of the required sizes of the electric motors used to start the engine. Moreover, the operating speed of the above-described second electric motor can be changed without an influence of the rotating speeds of the above-described drive wheels while the above-described lock-up clutch is given the torque capacity.

According to a second form of this invention, the control apparatus according to the above-described first form of the invention is configured such that an operating speed of the above-described second electric motor is temporarily raised while the power transmitting path between the second electric motor and said drive wheels is placed in the power cutoff state or the restricted power transmitting state, and before said lock-up clutch is given the torque capacity. According to this second form of the invention, the engine can be started with an aid of the inertia energy of the second electric motor which has been stored before the lock-up clutch is given the torque capacity and which is discharged when the lock-up clutch is given the torque capacity. Accordingly, the required sizes of the electric motors used to start the engine can be further reduced.

According to a third form of the invention, the control apparatus according to the above-described first or second form of the invention is configured such that the torque capacity of the above-described lock-up clutch is increased with an increase of an output torque of the above-described second electric motor, to prevent a slipping action of the lock-up clutch while the lock-up clutch is given the torque capacity.

According to this third form of the invention, the torque of the second electric motor is transmitted to the engine without the slipping action of the lock-up clutch, even when the lock-up clutch is not placed in its fully engaged state. Therefore, the engine can be efficiently cranked.

According to a fourth form of the invention, the control apparatus according to any one of the above-described first through third forms of the invention is configured such that the torque capacity of the above-described lock-up clutch is reduced with an increase of a torque capacity of the power transmitting path between the above-described second electric motor and the above-described drive wheels, while the power transmitting path between the second electric motor and the drive wheels is placed in the restricted power transmitting state when said lock-up clutch is given the torque capacity. According to this fourth form of the invention, it is possible to maintain the value of acceleration of a vehicle which is running while the power transmitting path between the second electric motor and the drive wheels is placed in the restricted power transmitting state. In this respect, it is noted that a shock caused by starting of the engine is more likely to be transmitted to the drive wheels when the torque capacity of the power transmitting path is relatively large. However, the degree of transmission of this shock can be reduced by reducing the torque capacity of the lock-up clutch.

According to a fifth form of the invention, the control apparatus according to any one of the first through fourth forms of the invention is configured such that a torque of the above-described first electric motor is used to damp a torque pulsation of a crankshaft of the above-described engine during starting of the engine, and a torque of the above-described second electric motor is used to damp a torque pulsation in a power transmitting path between the above-described fluid-operated power transmitting device and the above-described drive wheels during starting of the engine. According to this form of the invention, vibrations of the vehicle body can be damped by using the above-described first electric motor and the above-described second electric motor, namely, by using both of the first and second electric motors to generate a compensating torque for damping the vehicle body vibrations. Accordingly, the required size of each of the electric motors can be made smaller than in the case where the vehicle body vibrations are damped by using only one electric motor. That is, it is not necessary to increase the size of each of the two electric motors for damping the vehicle body vibrations, and it is possible to prevent an increase of the required size of the electric motors used to damp the vehicle body vibrations.

MODE FOR CARRYING OUT THE INVENTION

Figure 1:
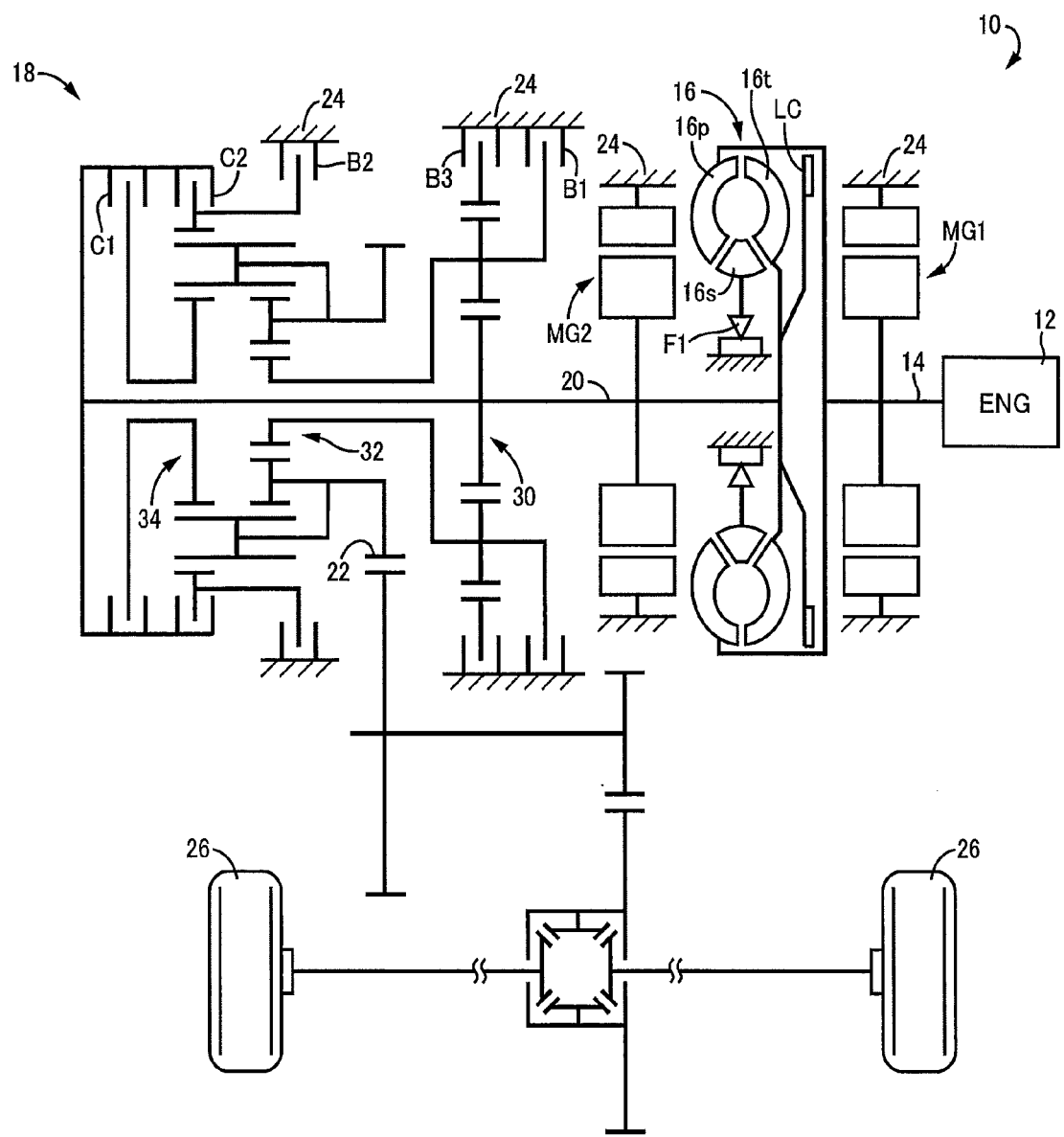
FIG. 1 is a schematic view for explaining an arrangement of a vehicular drive system according to one embodiment of this invention.

In one preferred mode of this invention, the above-described vehicular drive system is provided with an automatic transmission which constitutes a portion of a power transmitting path between the above-described fluid-operated power transmitting device and the above-described drive wheels. This automatic transmission may be one of: a known automatic transmission of a planetary gear type having a plurality of gear positions which are selectively established by selectively connecting rotary members of a plurality of planetary gear sets to each other through coupling devices; an automatic transmission of a synchronous meshing parallel two-axes type which is automatically shifted by actuators to selectively establish gear positions; a so-called DCT (Dual Clutch Transmission) which is a synchronous meshing parallel two-axes type having two input shafts; and a so-called belt type continuously variable transmission or a so-called troidal type continuously variable transmission, a speed ratio of which is changed continuously without a stepping change. Where the automatic transmission is disposed on the output side of the above-described second electric motor, a power transmitting path between the second electric motor and the above-described drive wheels is brought into a power cutoff state or restricted power transmitting state, by reducing the torque capacity of the automatic transmission. Where above-described automatic transmission is the automatic transmission of the planetary gear type, for example, the torque capacity of the automatic transmission is reduced by placing the automatic transmission in its neutral sate or by reducing the torque capacity of a coupling device to be placed in the engaged state to establish the selected gear position of the automatic transmission. Where the above-described automatic transmission is the belt type continuously variable transmission, the torque capacity of the automatic transmission is reduced by reducing the torque capacity of a coupling device incorporated in a known forward drive/reverse drive switching device, or the torque capacity of a clutch disposed in series with the belt type continuously variable transmission.

In another preferred mode of the invention, the torque of at least one of the above-described first electric motor and the above-described second electric motor is increased with a decrease of the temperature of the above-described engine. In this preferred mode, the above-described engine can be rapidly started irrespective of the temperature of the engine, by using the above-described first and second electric motors, in order to deal with an increase of the torque required for cranking the engine (namely, the above-indicated engine starting torque) in a cold state of the engine in which the viscosity of a lubricating oil for the engine is comparatively high.

In a further preferred mode of the invention, the torque of at least one of the above-described first electric motor and the above-described second electric motor is increased with an increase of the required amount of acceleration of the vehicle. In this preferred mode, the above-described engine can be rapidly started by using the above-described first and second electric motors, even when a comparatively large amount of acceleration of the vehicle is required by the vehicle operator who desires to rapidly increase the vehicle drive force.

In a still further preferred mode of the invention, the torque of at least one of the above-described first electric motor and the above-described second electric motor is made larger in a resonance band of the above-described engine in which resonance is relatively likely to take place due to a rotary motion pulsation of the engine, than in a band other than the above-indicated resonance band. According to this mode of the invention, the engine can be started by using the above-described first and second electric motors, such that the vibrations of the vehicle body remain, for only a short time, in the resonance band of the engine in which the vehicle body vibrations tend to have a large amplitude.

The above-described fluid-operated power transmitting device is preferably a torque converter provided with a pump impeller serving as the above-described input rotary member, a turbine impeller serving as the above-described output rotary member, and a stator impeller.

Embodiments of the present invention will be described in detail by reference to the drawings.

First Embodiment

FIG. 1 is the schematic view for explaining the arrangement of a vehicular drive system 10 according to one embodiment of this invention. As shown in FIG. 1, the vehicular drive system 10 is suitably used for a vehicle of an FF (front-engine front-drive) type, and is provided with; an internal combustion engine in the form of an engine 12; a torque converter (fluid-operated power transmitting device) 16 connected to a crankshaft 14 of the engine 12; an automatic transmission 18 which is disposed between the torque converter 16 and drive wheels 26 and which is connected to an output side of the torque converter 16; a first electric motor MG1 which is disposed between the engine 12 and the torque converter 16 and which is connected to the crankshaft 14; and a second electric motor MG2 which is disposed between the torque converter 16 and the automatic transmission 18 and which is connected to an input shaft 20 of the automatic transmission 18.

The torque converter 16 is a fluid-operated power transmitting device provided with: a pump impeller 16p serving as an input rotary member configured to receive a drive force from the engine 12; a turbine impeller 16t serving as an output rotary member from which the drive force is transmitted to the drive wheels 26; a stator impeller 16s; and a one-way clutch F1. The pump impeller 16p is connected to the crankshaft 14 of the engine 12 and the first electric motor MG1, and is rotated by the engine 12 to cause flows of a working fluid within the torque converter 16. The turbine impeller 16t is connected to the input shaft 20 of the automatic transmission 18, and is rotated by the fluid flows generated by the pump impeller 16p. The stator impeller 16s is disposed within a mass of the working fluid flowing from the above-indicated pump impeller 16p to the above-indicated turbine impeller 16t, and is supported by the one-way clutch F1 such that the stator impeller 16s is rotatable in the forward rotating direction of the crankshaft 14 (in the direction of rotation of the crankshaft 14 during an operation of the engine 12) and is not rotatable in the reverse direction. The input shaft 20 of the above-indicated automatic transmission 18 also functions as an output shaft of the torque converter 16, namely, as a turbine shaft. In the present embodiment, the engine 12, the first electric motor MG1 and the pump impeller 16p are connected in series to each other, as seen in FIG. 1, so that a rotating speed Np of the pump impeller 16p (hereinafter referred to as a "pump speed Np") is equal to an operating speed Nmg1 of the first electric motor MG1 (hereinafter referred to as a "first electric motor speed Nmg1") and an operating speed Ne of the engine 12 (hereinafter referred to as an "engine speed Ne"). Further, the turbine impeller 16t, the second electric motor MG2 and the input shaft 20 of the automatic transmission 18 are connected in series to each other, so that a rotating speed Nt of the turbine impeller 16t (hereinafter referred to as a "turbine speed Nt") is equal to an operating speed Nmg2 of the second electric motor MG2 (hereinafter referred to as a "second electric motor speed Nmg2") and a rotating speed Natin of the input shaft 20 (hereinafter referred to as a "transmission input speed Natin").

The torque converter 16 is provided with a lock-up clutch LC configured to selectively connect the above-indicated pump impeller 16p and turbine impeller 16t. This lock-up clutch LC is operated with the working fluid (working oil) supplied from a hydraulic control unit 90 (shown in FIG. 4), such that the lock-up clutch LC is placed in a selected one of an engaged state, a slipping state and a released state. When the lock-up clutch LC is placed in the released state, a torque is transmitted between the crankshaft 14 and the input shaft 20, through the working oil within the torque converter 16, as described above. When the lock-up clutch LC is placed in the engaged state, the lock-up clutch LC mechanically and directly connects the pump impeller 16*p* and the turbine impeller 16*t* to each other, so that the crankshaft 14 of the engine 12 and the input shaft 20 of the automatic transmission 18 are rotated as a unit, namely, a torque is directly transmitted between the crankshaft 14 and the input shaft 20, without the working oil functioning to transmit the torque therebetween.

Figure 4:
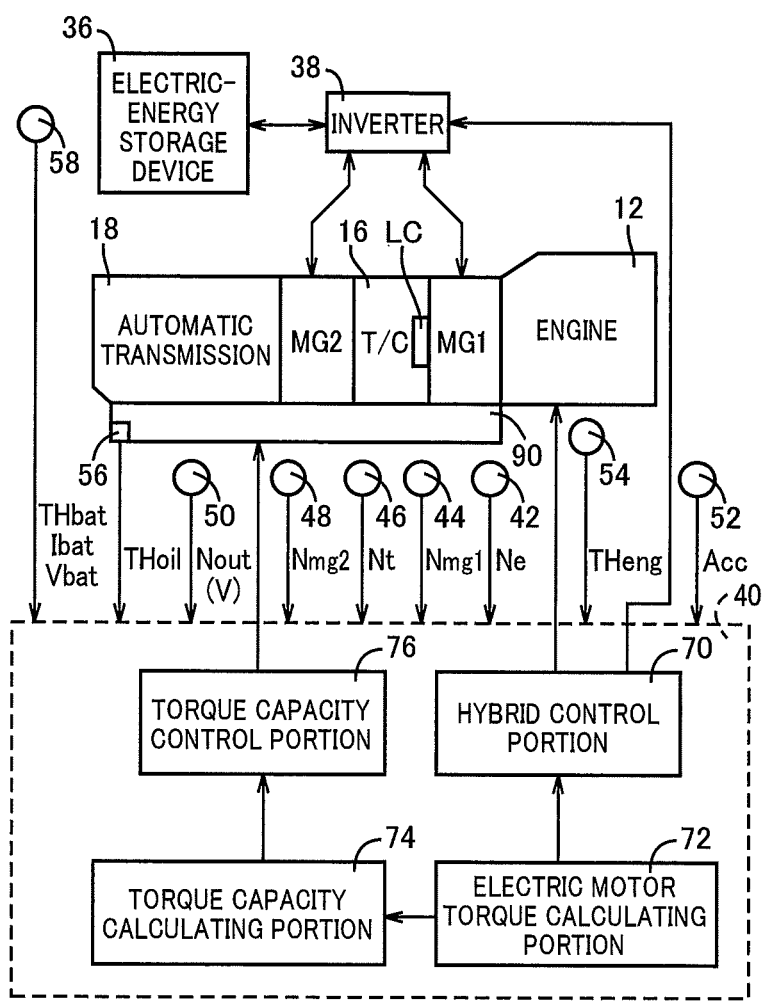
FIG. 4 is a block diagram illustrating major portions of a control system provided on a vehicle, and a functional block diagram illustrating major control functions of an electronic control device.

The first electric motor MG1 is connected in series to the crankshaft 14 of the engine 12 through a damper or any other device configured to absorb a pulsating motion of the engine 12, and is connected directly to the pump impeller 16*p* of the torque converter 16. Namely, the first electric motor MG1 is connected to a power transmitting path between the engine 12 and the torque converter 16. On the other hand, the second electric motor MG2 is connected to a power transmitting path between the torque converter 16 and the drive wheels 26, more specifically, connected indirectly to the drive wheels 26 through the automatic transmission 18, etc. Each of the first electric motor MG1 and the second electric motor MG2 is a motor which is operable to function selectively as an electric motor to generate a vehicle drive torque, and an electric generator to generate a regenerative torque, and which is an alternating motor/generator of a synchronous type. The vehicular drive system 10 is further provided with a battery or electric-energy storage device 36, and an inverter 38 for controlling the first and second electric motors MG1 and MG2 (, as shown in FIG. 4). The electric-energy storage device 36 is connected to the first and second electric motors MG1 and MG2 such that an electric energy can be supplied from and to the electric-energy storage device 36 to and from the first and second electric motors MG1 and MG2, respectively. These electric motors MG1 and MG2 are operated to generate drive torques for rotating the crankshaft 14 and the input shaft 20 in the forward direction, or driven to perform electricity generating operations (regenerative operations) for generating negative torques, that is, regenerative braking torques for rotating the crankshaft 14 and the input shaft 20 in the reverse direction, or charging the electric-energy storage device 36 through the inverter 38. It is noted that the above-indicated "forward direction" of rotation of the crankshaft 14 and the input 20 is the direction of operation of the crankshaft 14 during an operation of the engine 12, while the above-indicated "reverse direction" of rotation is opposite to the forward direction.

Figures 2, 3:
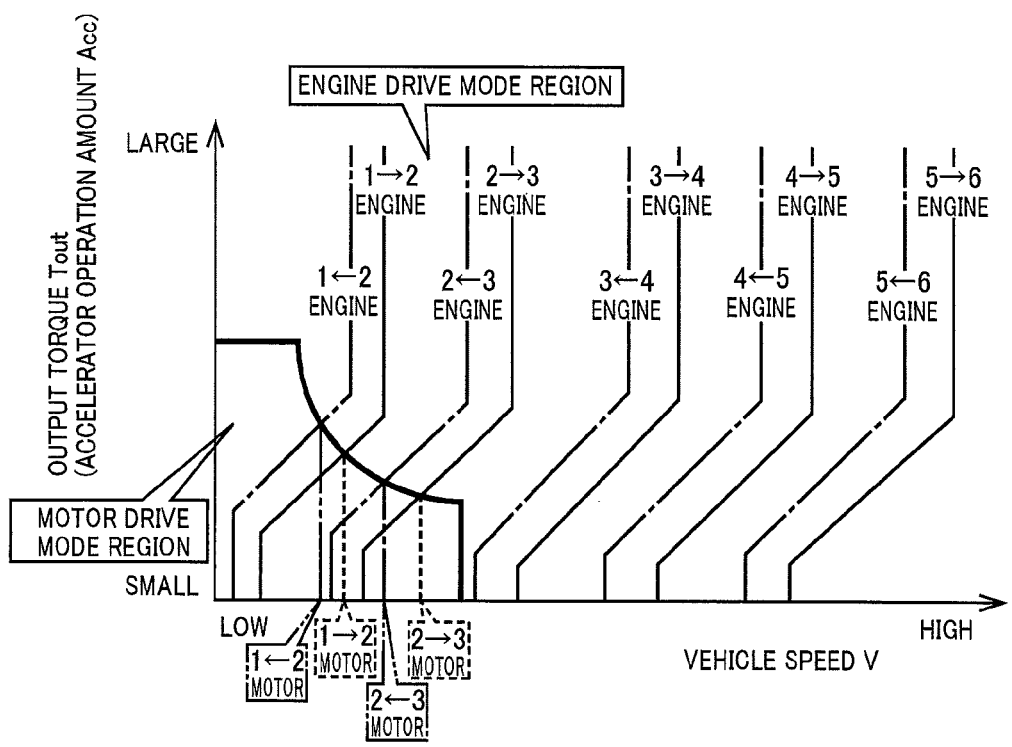
FIG. 2 is a table indicating operating states of hydraulically operated frictional coupling devices provided to establish operating positions of an automatic transmission shown in FIG. 1.
FIG. 3 is a view showing an example of a memory-stored shifting map used to determine shifting actions of the automatic transmission, an example of a memory-stored drive power source switching map used to switch a vehicle drive mode between an engine drive mode and a motor drive mode, and a relation of both maps.

The automatic transmission 18 is a mechanical type transmission which is interposed between the torque converter 16 and the drive wheels 26 and which constitutes a portion of the power transmitting path between the second electric motor MG2 and the drive wheels 26. Described more specifically, the automatic transmission 18 is a known multiple-step transmission of a planetary gear type provided with a first planetary gear set 30, a second planetary gear set 32, a third planetary gear set 34, and a plurality of hydraulically operated frictional coupling devices C1, C2, B1, B2 and B3 in a transmission case 24 as a non-rotative member. The automatic transmission 18 is configured such that the drive force of the engine 12 received by an input rotary member in the form of the input shaft 20 is transmitted from an output rotary member in the form of an output gear 22 to the drive wheels 26. This automatic transmission 18 is shifted to a selected one of a plurality of operating positions (gear positions) having respective different speed ratios γat (transmission input speed Natin/rotating speed Nout of the output gear 22), with each of the known hydraulically operated frictional coupling devices (clutches C1 and C2, and brakes B1, B2 and B3) being placed in the engaged or released state according to the table of FIG. 2, with the working oil being supplied from the hydraulic control unit 90 (shown in FIG. 4). In FIG. 2, a mark "o" indicates the engaged state of each frictional coupling device while blanks indicate the released state of each frictional coupling device. An automatic shifting control of the automatic transmission 18 is implemented according to a known predetermined memory-stored relationship (shifting map) which defines shift-up lines and shift-down lines, as indicated in FIG. 3 by way of example.

The vehicular drive system 10 constructed as described above is switched according to a running condition of the vehicle, between an engine drive mode in which the vehicle is run with the drive force of the engine 12, and a motor drive mode in which the vehicle is run with the drive force of the second electric motor MG2. The vehicular drive system 10 is switched between the above-indicated engine and motor drive modes, according to a known predetermined memory-stored relationship (drive power source switching map) which defines an engine drive region and a motor drive region in a two-dimensional coordinate system, like the above-indicated shifting map, as indicated in FIG. 3 by way of example. The vehicle according to the present embodiment is a hybrid vehicle which is switched between the engine drive mode and the motor drive mode.

It is noted here that even when a point indicative of the running condition of the vehicle lies in the motor drive region, the vehicular drive system 10 is placed in the engine drive mode if a state-of-charge amount (a charging capacity or a stored electric energy amount) SOC of the electric-energy storage device 36 is not higher than a predetermined threshold value. Further, the vehicle may be run with both of the outputs of the engine 12 and the second electric motor MG2, as needed, when the vehicle is required to be quickly or rapidly started or accelerated. It is also noted that an operating efficiency of the engine 12 is generally high when the engine 12 is operated at a comparatively low speed with a comparatively high load, and that an operating efficiency of the second electric motor MG2 is generally high when the second electric motor MG2 is operated at a comparatively high speed with a comparatively low load. Accordingly, two different sets of the different shift-up lines and shift-down lines are provided respectively for the motor drive mode and the engine drive mode, as indicated in FIG. 3, so that the lower gear position is established in the motor drive mode in the motor drive region than in the engine drive mode for the same running condition.

FIG. 4 is the view for explaining input signals received by an electronic control device 40 for controlling the vehicular drive system 10, from various sensors, and the functional block diagram illustrating major control functions of the electronic control device 40. The electronic control device 40 shown in FIG. 4 functions as a control apparatus for the vehicular drive system 10, and includes a so-called microcomputer incorporating a CPU, a RAM, a ROM and an input-output interface. The CPU performs signal processing operations according to programs stored in the ROM, while utilizing a temporary data storage function of the RAM, to implement an output control of the engine 12, a shifting control of the automatic transmission 18, output controls of the electric motors MG1 and MG2, and a torque capacity control of the lock-up clutch LC. The electronic control device 40 is configured to receive output signals of the various sensors provided on the vehicle as indicated in FIG. 4, which sensors include, for example: speed sensors 42, 44, 46, 48 and

50; an accelerator pedal operation amount sensor 52; a cooling water temperature sensor 54; an oil temperature sensor 56; and a battery sensor 58. For example, those output signals represent: the engine speed Ne; the first electric motor speed Nmg1; the turbine speed Nt; the second electric motor speed Nmg2; the transmission output speed Nout which is the rotating speed of the output gear 22, which corresponds to a running speed V of the vehicle; an operation amount Acc of an accelerator pedal; a cooling water temperature THeng, which is a temperature of a cooling water of the engine 12, which corresponds to a temperature of the engine 12; a working oil temperature THoil, which is a temperature of the working oil used to operate the torque converter 16 and the automatic transmission 18; and a battery temperature THbat, a battery charging/discharging current Ibat and a battery voltage Vbat of the electric-energy storage device 36. The electronic control device 40 is further configured to generate various output signals to be applied to various devices such as the engine 12, the inverter 38 and the hydraulic control unit 90. Those output signals include, for example, engine output control signals, electric motor output control signals, and hydraulic control signals. The electronic control device 40 is also configured to calculate from time to time the charging capacity SOC of the electric-energy storage device 36, on the basis of the above-indicated battery temperature THbat, battery charging/discharging current Ibat and battery voltage Vbat, for instance.

When the engine 12 is required to be started while the engine 12 is at rest in the vehicle according to the present embodiment, a selected one of the first and second electric motors MG1 and MG2 may be used to start the engine 12. For example, the engine 12 is cranked with a starting torque Tst generated by the selected electric motor MG (namely, the engine starting torque Tst is a torque required to start the engine 12), and the engine 12 is started by initiating ignition of the engine 12 and a fuel supply to the engine 12 while the engine 12 is cranked at a speed not lower than a complete-explosion lower limit value above which complete explosion of the engine 12 is possible.

By the way, the single electric motor MG used to start the engine 12 is required to be able to generate the engine starting torque Tst which is large enough to permit adequate starting of the engine 12. In this respect, it is considered in particular that the engine starting torque Tst required when the temperature of the engine 12 is comparatively low (when the engine 12 is in a cold state before completion of a warm-up operation, for instance) is larger than that required after completion of the warm-up operation, due to a comparatively high degree of viscosity of an engine lubricating oil. Accordingly, the electric motor MG is required to be able to generate a torque large enough to permit rapid starting of the engine 12 irrespective of the temperature of the engine 12, that is, to permit starting of the engine 12 in a cold state. It is also considered that when the required amount of acceleration of the vehicle as represented by the accelerator pedal operation amount Acc is comparatively high, the user or operator of the vehicle wants to more rapidly increase the vehicle drive force, than when the required amount of acceleration of the vehicle is comparatively low. Accordingly, the electric motor MG is required to be able to generate a torque large enough to permit rapid starting of the engine 12 when the required amount of acceleration of the vehicle is comparatively high.

For preventing an increase of the required sizes of the electric motors MG, in view of the above-described considerations, the electronic control device 40 according to the present embodiment is configured to operate the first electric motor MG1 and the second electric motor MG2 to generate the engine starting torque Tst while the lock-up clutch LC is given a torque capacity for starting the engine 12. Namely, the two electric motors MG are assigned to generate the required engine starting torque Tst, for reducing the load acting on each of the electric motors MG upon starting of the engine 12, to thereby prevent an increase of the required size of each electric motor MG for starting the engine 12.

Described more specifically, hybrid control means in the form of a hybrid control portion 70 shown in FIG. 4 is configured to determine whether the engine 12 is required to be started while the engine 12 is at rest. For instance, the hybrid control portion 70 determines a requirement for starting of the engine 12, in one of the following cases: a case where the point indicative of the vehicle running state as represented by the accelerator pedal operation amount Acc and the vehicle running speed V has moved from the motor drive region into the engine drive region during running of the vehicle in the motor drive mode; a case where the state-of-charge amount SOC of the electric-energy storage device 36 has decreased below a predetermined memory-stored lower limit above which the electric-energy storage device 36 is not required to be charged; and a case where the cooling water temperature THeng of the engine 12 is lower than a predetermined memory-stored lower limit above which the engine 12 is determined to be placed in a sufficiently warm-up state.

When the hybrid control portion 70 has determined that the engine 12 is required to be started while the engine 12 is at rest, electric motor torque calculating means in the form of an electric motor torque calculating portion 72 is configured to calculate a first electric motor torque Tmg1*st* and a second electric motor torque Tmg2*st*, which are respectively the output torques of the first and second electric motors MG1 and MG2 required to generate the engine starting torque Tst.

Figure 5:
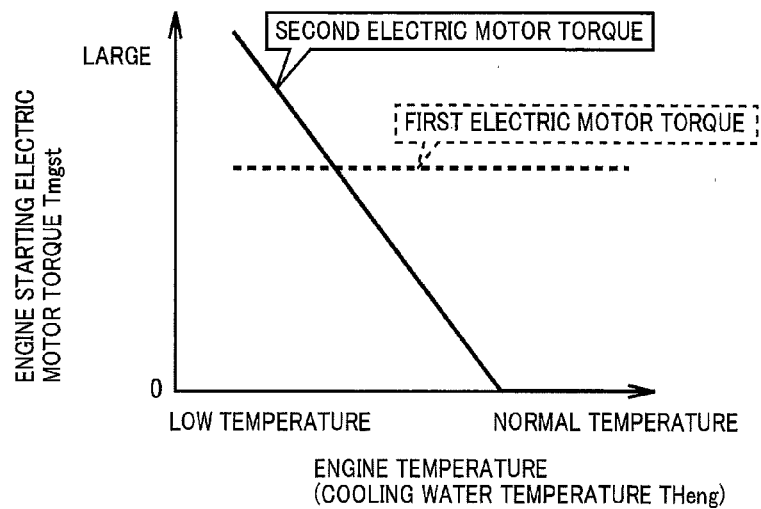
FIG. 5 is a view indicating an example of a memory-stored cold-state electric motor torque map predetermined to generate an engine starting torque such that the engine starting torque increases with a decrease of an engine cooling water temperature.

For instance, the electric motor torque calculating portion 72 obtains information on the actual cooling water temperature THeng on the basis of the various input signals, and calculates the first electric motor torque Tmg1*st* and the second electric motor torque Tmg2*st* required to generate the engine starting torque Tst, on the basis of the obtained actual cooling water temperature THeng, and according to a predetermined relationship as indicated in FIG. 5. This relationship of FIG. 5 is a memory-stored cold-state electric motor torque map which is predetermined such that the engine starting torque Tst to be generated increases with a decrease of the temperature of the engine 12 (as represented by the cooling water temperature THeng), so that the engine 12 can be rapidly started irrespective of the temperature of the engine 12. The "normal temperature" indicated in the cold-state electric motor torque map of FIG. 5 is the above-indicated lower limit of the engine temperature (cooling water temperature THeng) above which the engine 12 is determined to be placed in the sufficiently warmed-up state. According to the cold-state electric motor torque map of FIG. 5, the first electric motor torque Tmg1*st* is constant irrespective of the engine temperature, while the second electric motor torque Tmg2*st* increases with a decrease of the engine temperature, as the required engine starting torque Tst is increased with the decrease of the engine temperature. Namely, the cold-state electric motor torque map of FIG. 5 is formulated such that the required engine starting torque Tst is provided by only the constant first electric motor torque Tmg1*st* while the engine 12 is in the sufficiently warmed-up state, and by both the constant first electric motor torque Tmg1*st*, and the second electric motor torque Tmg2*st* increasing with the decrease of the engine temperature while the engine 12 is in the cold state.

Figure 6:
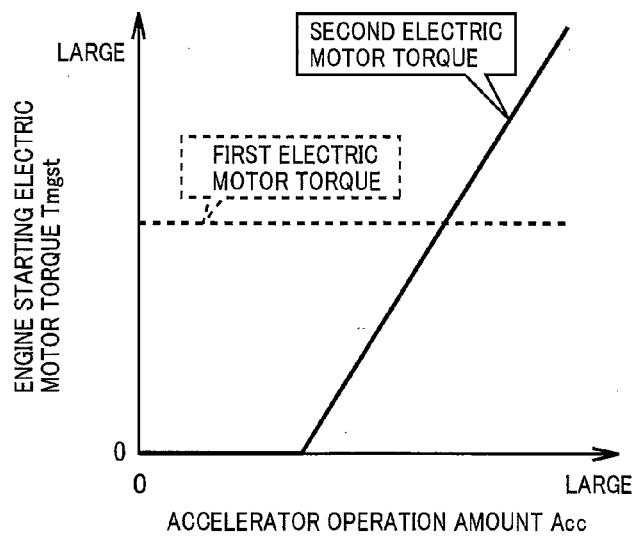
FIG. 6 is a view indicating an example of a memory-stored acceleration-required electric motor torque map predetermined to generate an engine starting torque such that the engine starting torque increases with an increase of an operation amount of an accelerator pedal.

The electric motor torque calculating portion 72 is further configured to obtain information on the actually required amount of acceleration of the vehicle as represented by the accelerator pedal operation amount Acc, on the basis of the various input signals, and calculate the first electric motor torque Tmg1st and the second electric motor torque Tmg2st required to generate the engine starting torque Tst, on the basis of the obtained actually required amount Acc of acceleration of the vehicle, and according to a predetermined relationship as indicated in FIG. 6. This relationship of FIG. 6 is a memory-stored acceleration-required electric motor torque map which is predetermined such that the engine starting torque Tst to be generated increases with an increase of the accelerator pedal operation amount Acc, so that the engine 12 can be started (that is, the engine speed Ne can be sufficiently raised) in a length of time which decreases with the increase of the required amount of acceleration of the vehicle. According to the acceleration-required electric motor torque map of FIG. 6, the first electric motor torque Tmg1st is constant irrespective of the accelerator pedal operation amount Acc, while the second electric motor torque Tmg2st increases with an increase of the accelerator pedal operation amount Acc, as the required engine starting torque Tst is increased with the increase of the accelerator pedal operation amount Acc. Namely, the acceleration-required electric motor torque map of FIG. 6 is formulated such that the required engine starting torque Tst is provided by only the constant first electric motor torque Tmg1st while the accelerator pedal operation amount Acc is comparatively small, and by both the constant first electric motor torque Tmg1st, and the second electric motor torque Tmg2st increasing with the increase of the engine temperature while the accelerator pedal operation amount Acc is comparatively large.

The electric motor torque calculating portion 72 then determines, as electric motor torque values Tmgst for starting the engine 12, a larger one of the values of the first electric motor torque Tmg1st, which values have been respectively calculated on the basis of the actual cooling water temperature THeng and the actual accelerator pedal operation amount Acc, and a larger one of the values of the second electric motor torque Tmg2st, which values have been respectively calculated on the basis of the actual cooling water temperature THeng and the actual accelerator pedal operation amount Acc.

Figure 7:
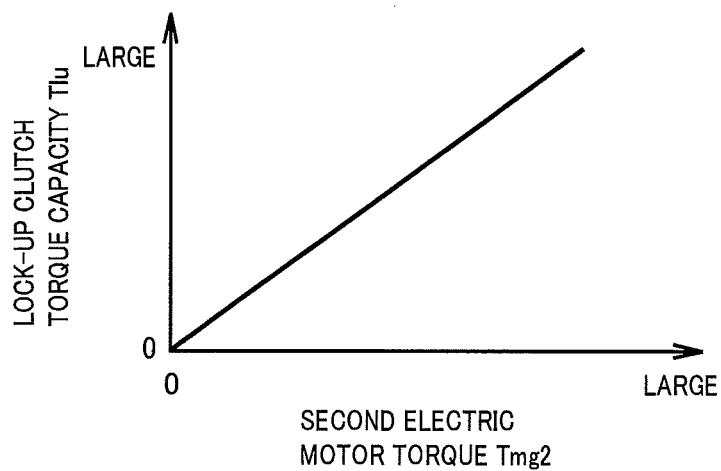
FIG. 7 is a view indicating an example of a memory-stored lock-up clutch torque capacity map predetermined to determine a torque capacity of a lock-up clutch such that the torque capacity of the lock-up clutch is larger than a torque of a second electric motor and such that the torque capacity of the lock-up clutch is minimized to the extent that permits a totally slip-free state of the lock-up clutch.

Torque capacity calculating means in the form of a torque capacity calculating portion 74 is configured to calculate a torque capacity of the lock-up clutch LC (lock-up clutch torque capacity or LU torque capacity) Tlu required to transmit the second electric motor torque Tmg2st, on the basis of the second electric motor torque Tmg2st calculated by the electric motor torque calculating portion 72, and according to a relationship as indicated in FIG. 7. The relationship of FIG. 7 is a memory-stored LU torque capacity map predetermined to determine the LU torque capacity Tlu such that the LU torque capacity Tlu is larger than the second electric motor torque Tmg2st and such that the LU torque capacity Tlu is minimized to the extent that permits a totally slip-free state of the lock-up clutch LC, so that the second electric motor torque Tmg2st is transmitted to the engine 12 without the working fluid functioning to transmit the second electric motor torque Tmg2st (namely, so as to prevent a decrease of the transmitted second electric motor torque Tmg2st due to a slipping action of the lock-up clutch LC). That is, the LU torque capacity map of FIG. 7 is formulated such that the LU torque capacity Tlu to be given to the lock-up clutch LC increases with an increase of the second electric motor torque Tmg2st while the LU torque capacity Tlu, is minimized to the extent that permits the totally slip-free state of the lock-up clutch LC.

Referring back to FIG. 4, the hybrid control portion 70 applies electric motor output control signals to the inverter 38, to control the first electric motor MG1 and the second electric motor MG2 to generate the first electric motor torque Tmg1st and the second electric motor torque Tmg2st which have been determined by the electric motor torque calculating portion 72 upon determination of the above-indicated requirement for starting of the engine 12 and which are required to start the engine 12, so that the operating speed of the engine 12 is raised to the complete-explosion lower limit value or higher. At the same time, the hybrid control portion 70 initiates the ignition of the engine 12 and the fuel supply to the engine 12, to start the engine 12.

Torque capacity control means in the form of a torque capacity control portion 76 is configured to apply to the hydraulic control unit 90 a lock-up clutch engagement hydraulic pressure command, that is, a hydraulic control signal for obtaining the LU torque capacity Tlu which has been calculated by the torque capacity calculating portion 74 upon determination by the hybrid control portion 70 of the requirement for starting of the engine 12 held at rest and which is required to transmit the second electric motor torque Tmg2st, so that the lock-up clutch LC is brought into a partially engaged state. Namely, when the lock-up clutch LC is given the LU torque capacity Tlu to start the engine 12, the lock-up clutch LC is not controlled to be placed in its fully engaged state with a predetermined memory-stored maximum lock-up clutch engagement hydraulic pressure, but is controlled to be placed in a partially engaged state with a lock-up clutch engagement hydraulic pressure determined to obtain the LU torque capacity Tlu according to the second electric motor torque Tmg2st.

As described above, it is more advantageous in terms of the fuel economy, to efficiently crank the engine 12 with the LU torque capacity Tlu determined according to the second electric motor torque Tmg2st, without a slipping action of the lock-up clutch LC. By the way, it is noted that when a shift lever is placed in a neutral position (position "N") or a parking position (position "P"), the automatic transmission 18 is placed in its neutral position, so that the power transmitting path (including the automatic transmission 18, for instance) between the second electric motor MG2 and the drive wheels 26 is placed in a power cutoff state, and that when the shift lever is placed in an operating position other than the positions "N" and "P" (for example, in a forward driving position "D"), on the other hand, the automatic transmission 18 is placed in any one of the power transmitting gear positions, namely, is placed in a power transmitting state. Accordingly, when the shift lever is placed in the position "N" or "P", the second electric motor speed Nmg2 can be changed without an influence of the rotating speeds of the drive wheels 26, so that the lock-up clutch LC can be engaged upon starting of the engine 12. When the shift lever is placed in any operating position other than the positions "N" and "P", on the other hand, the second electric motor speed Nmg2 is influenced by the rotating speeds of the drive wheels 26, so that the lock-up clutch LC cannot be engaged upon starting of the engine 12. In view of the above, the electronic control device 40 according to the present embodiment is configured to give the lock-up clutch LC the LU torque capacity Tlu while the automatic transmission 18 is placed in the power cutoff state. However, the electronic control device 40 may be configured to give the lock-up clutch LC the LU torque capacity Tlu while the automatic transmission 18 is not placed in the fully power cutoff state, but is placed in a restricted power transmitting state permitting some degree of power transmission, as far as the second electric motor speed Nmg2 can be changed without an influence of the rotating speeds of the drive wheels 26.

Figure 8:
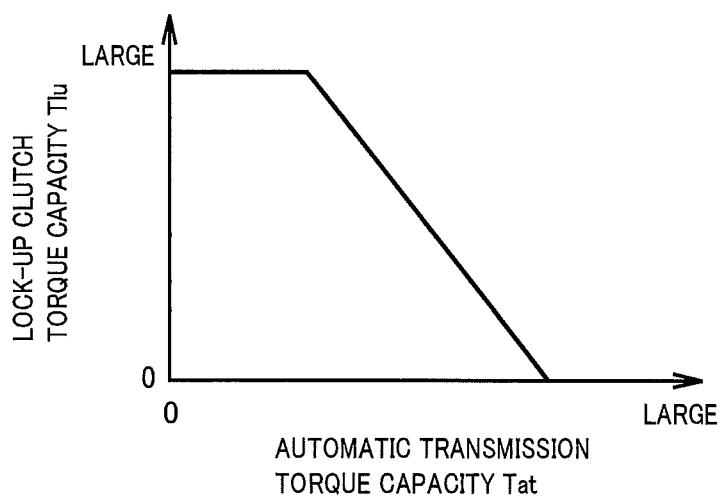
FIG. 8 is a view indicating an example of a memory-stored restricted-power-transmission lock-up clutch torque capacity map predetermined to determine the torque capacity of the lock-up clutch such that the torque capacity of the lock-up clutch decreases with an increase of a torque capacity of the automatic transmission.

When the shift lever is placed in any operating position other than the positions "N" and "P", the torque capacity control portion 76 places the power transmitting path between the second electric motor MG2 and the drive wheels 26, in the power cutoff state or restricted power transmitting state, by zeroing or reducing a transmission torque capacity Tat of the above-indicated power transmitting path (automatic transmission torque capacity Tat). For example, the torque capacity control portion 76 places the above-indicated power transmitting path in the power cutoff state by zeroing the automatic transmission torque capacity Tat, when the vehicle is stationary with the shift lever being placed in any operating position other than the positions "N" and "P". In this respect, it is noted that while the vehicle is stationary, a drive force need not be transmitted to the drive wheels 26 through the automatic transmission 18 during starting of the engine 12. When the shift lever is placed in a position other than "N" and "P" while the vehicle is actually running at a given running speed V in the motor drive mode, on the other hand, the torque capacity control portion 76 places the above-indicated power transmitting path in the restricted power transmitting state by reducing the automatic transmission torque capacity Tat. In this respect, it is noted that while the vehicle is actually running at the give running speed V in the motor drive mode, the second electric motor torque Tmg2 need to be transmitted to the drive wheels 26 through the automatic transmission 18, in order to maintain an acceleration value G of the vehicle during starting of the engine 12, at the value prior to the starting of the engine 12. Accordingly, the torque capacity control portion 76 reduces the automatic transmission torque capacity Tat within a range that permits a torque corresponding to the second electric motor torque Tmg2 prior to the starting of the engine 12, to be transmitted to the drive wheels 26 through the automatic transmission 18. The automatic transmission torque capacity Tat is equal to a torque of the input shaft 20 which is a sum of torque capacities of the hydraulically operated frictional coupling devices. Therefore, the automatic transmission torque capacity Tat can be reduced by lowering the engagement hydraulic pressure corresponding to a torque capacity of one of the hydraulically operated frictional coupling devices which are placed in the engaged state to establish the present gear position of the automatic transmission 18. For instance, the torque capacity control portion 76 reduces the automatic transmission torque capacity Tat by controlling the engagement hydraulic pressure of the clutch C1 when any one of the first gear position (position "1st") through the fourth gear position (position "4th") is presently established, or the engagement hydraulic pressure of the clutch C2 when one of the fifth gear position (position "5th") or sixth gear position (position "6th") is presently established, as is apparent from the table of FIG. 2 indicating the operating states of the frictional coupling devices. 1f the torque capacity of at least one of the hydraulically operated frictional coupling devices placed in the engaged state to establish the present gear position is zeroed, the automatic transmission torque capacity Tat is zeroed.

Where the automatic transmission torque capacity Tat is reduced upon starting of the engine 12 while the vehicle is actually running at a given running speed V in the motor drive mode with the shift lever being placed in any operating position other than the positions "N" and "P", as described above, a shock caused by the starting of the engine 12 is more likely to be transmitted to the drive wheels 26 through the lock-up clutch LC and the automatic transmission 18, giving rise to a risk of generation of uncomfortable vibrations of the vehicle body, when the automatic transmission torque capacity Tat is relatively large. In view of this problem, the torque capacity control portion 76 reduces the LU torque capacity Tlu to be given to the lock-up clutch LC, with an increase of the automatic transmission torque capacity Tat, in order to minimize the risk of transmission of the above-indicated shock due to the starting of the engine 12, where the torque capacity control portion 76 places the automatic transmission 18 in the restricted power transmitting state. In this case, the torque capacity calculating portion 74 calculates the LU torque capacity Tlu on the basis of the automatic transmission torque capacity Tat corresponding to the second electric motor torque Tmg2 prior to the starting of the engine 12, and according to a relationship indicated in FIG. 8. This relationship of FIG. 8 is a memory-stored restricted-power-transmission lock-up clutch torque capacity map predetermined to determine the LU torque capacity Tlu such that the LU torque capacity Tlu decreases with an increase of the automatic transmission torque capacity Tat when the automatic transmission torque capacity Tat is comparatively large, so that the shock due to the starting of the engine 12 can be reduced. The torque capacity calculating portion 74 determines, as the LU torque capacity Tlu to be established during the starting of the engine 12, a smaller one of the values of the LU torque capacity Tlu which have been respectively calculated on the basis of the second electric motor torque Tmg2st and according to the relationship of FIG. 7 and on the basis of the automatic transmission torque capacity Tat and according to the relationship of FIG. 8. Alternatively, the torque capacity calculating portion 74 does not determine the LU torque capacity Tlu during the starting of the engine 12, on the basis of the second electric motor torque capacity Tmg2st and according to the relationship of FIG. 7, but determines the LU torque capacity Tlu during the starting of the engine 12, on the basis of the automatic transmission torque capacity Tat and according to the relationship of FIG. 8. Where the LU torque capacity Tlu during the starting of the engine 12 is determined on the basis of the automatic transmission torque capacity Tat, the lock-up clutch LC may possibly have a slipping action, but this manner of determination gives a higher degree of priority to the reduction of the risk of transmission of the shock due to the starting of the engine 12, than to an improvement of the operating efficiency (fuel economy) and rapidity of starting of the engine 12. Where the vehicle is actually running at a given running speed in the motor drive mode with the shift lever being placed in any operating position other than the positions "N" and "P", the torque capacity control portion 76 places the lock-up clutch LC in a partially engaged state, by applying the lock-up clutch engagement hydraulic pressure command to the hydraulic control unit 90, as the hydraulic pressure control signal for establishing the LU torque capacity Tlu during the starting of the engine 12, which has been determined by the torque capacity calculating portion 74.

Figure 9:
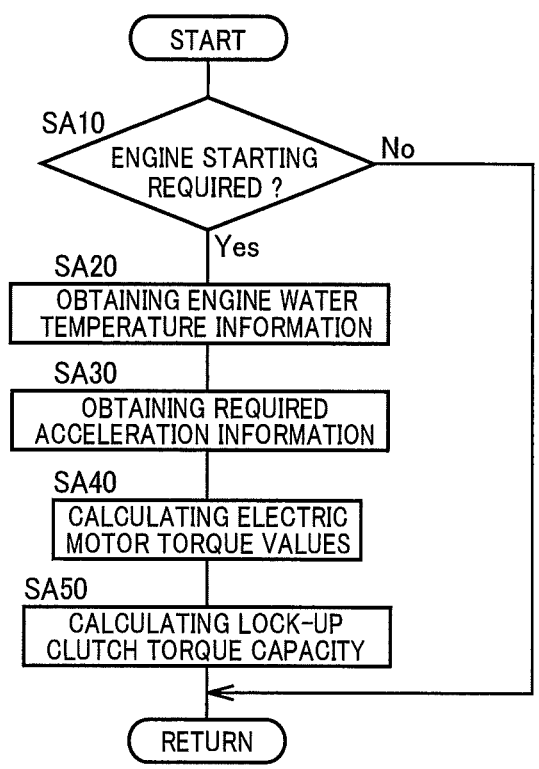
FIG. 9 is a flow chart illustrating a major control operation of the electronic control device, namely, a control operation which makes it possible to prevent an increase of the required sizes of engine starter electric motors.
Figure 10:
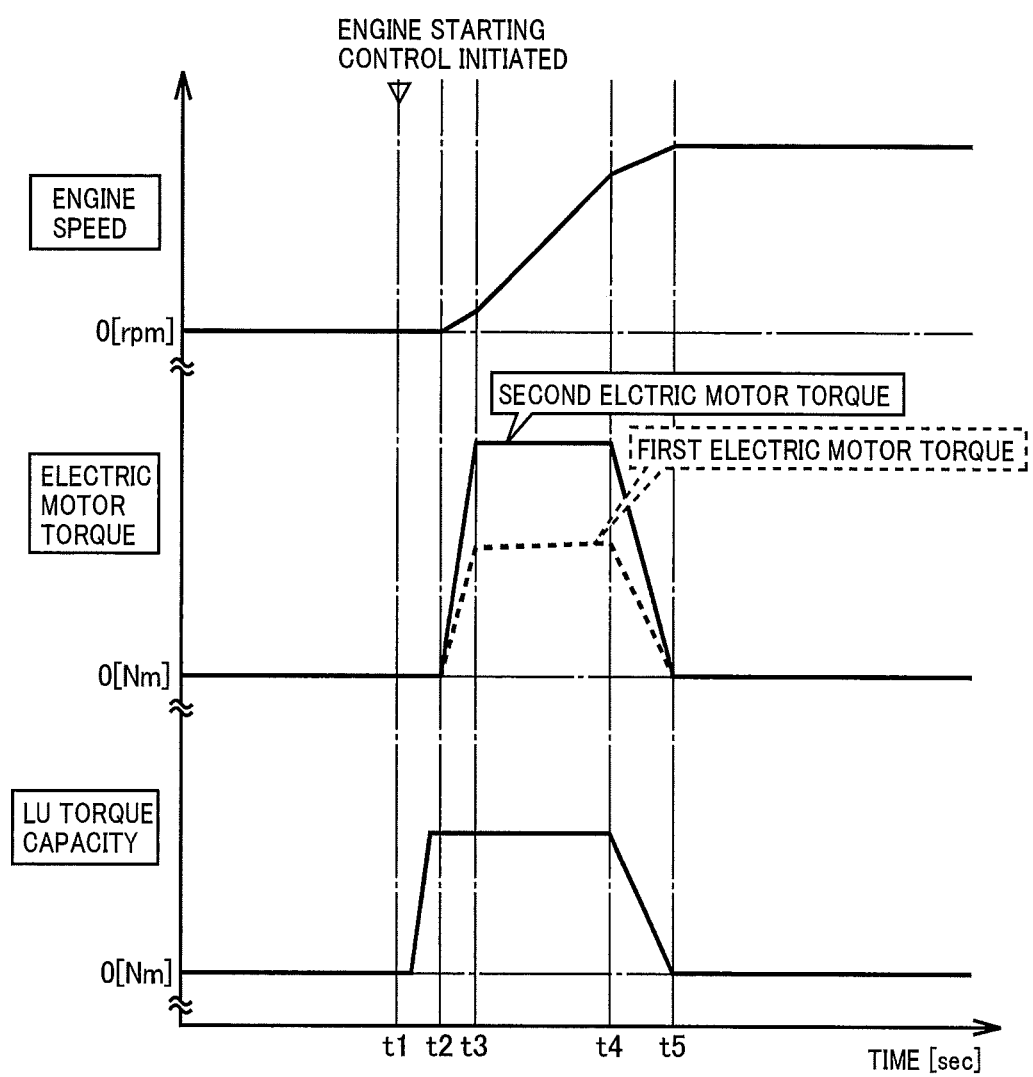
FIG. 10 is a time chart indicating an example of the control operation illustrated in the flow chart of FIG. 9, which is performed when an engine is started while the vehicle is stationary.
Figure 11:
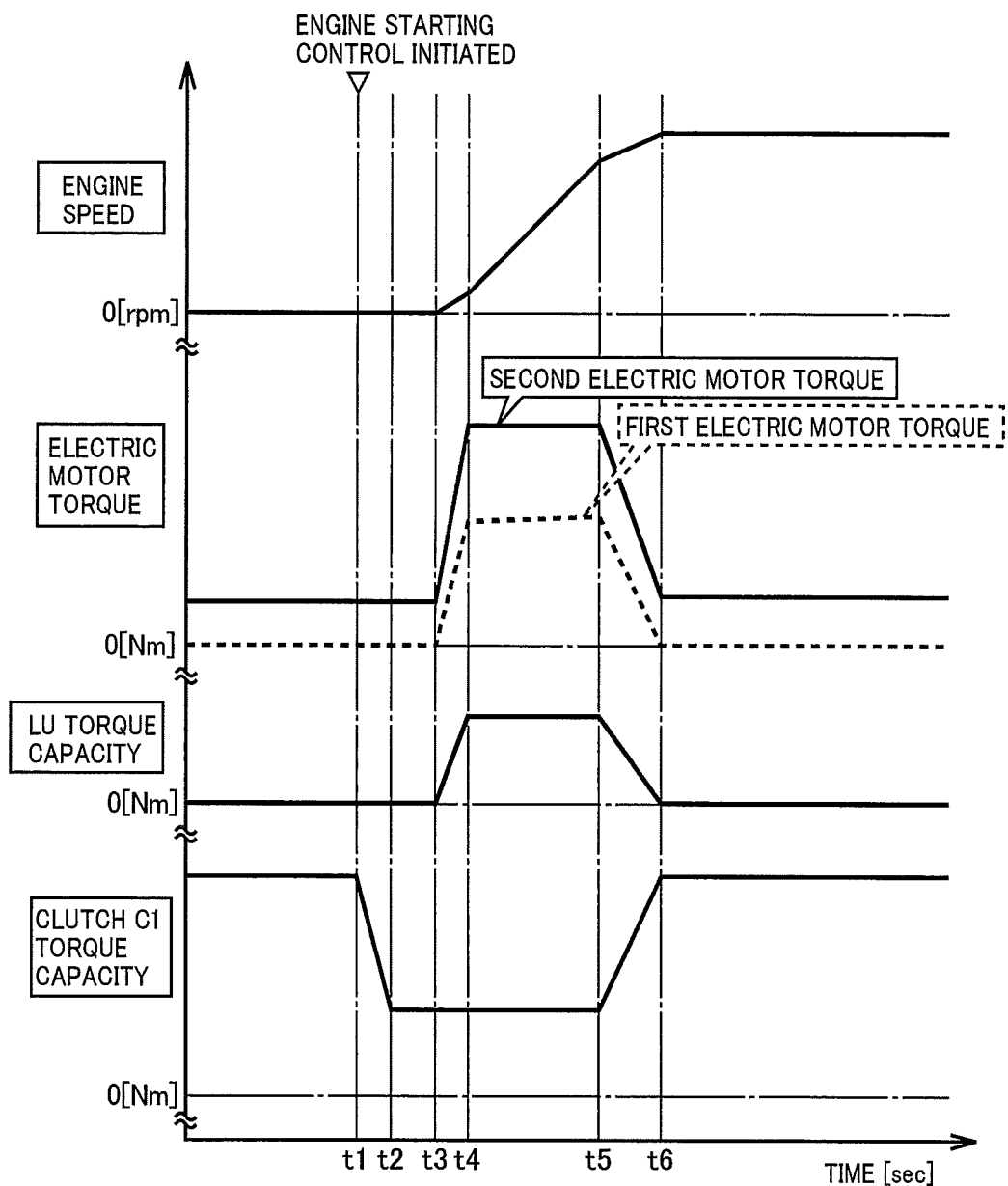
FIG. 11 is a time chart indicating an example of the control operation illustrated in the flow chart of FIG. 9, which is performed when the engine is started during running of the vehicle in the motor drive mode.

FIG. 9 is the flow chart illustrating a major control operation of the electronic control device 40, namely, a control operation which makes it possible to prevent an increase of the required sizes of the electric motors MG used to start the engine 12. This control operation is repeatedly performed with an extremely short cycle time from about several milliseconds to about several tens of milliseconds. FIGS. 10 and 11 are the time charts indicating the control operation illustrated in the flow chart of FIG. 9. FIG. 10 is the time chart indicating an example of the control operation to be performed when the engine 12 is started while the vehicle is stationary, while FIG. 11 is the time chart indicating an example of the control operation to be performed when the engine 12 is started during running of the vehicle in the motor drive mode.

The control operation of FIG. 9 is initiated with step SA10 (hereinafter "step" being omitted) corresponding to the hybrid control portion 70, to determine whether the engine 12 is required to be started while the engine 12 is at rest. If a negative determination is obtained in SA10, the present control routine is terminated. If an affirmative determination is obtained in SA10, the control flow goes to SA20 and SA30 corresponding to the electric motor torque calculating portion 72, to obtain the information on the actual cooling water temperature THeng, and an actual amount of requirement for acceleration of the vehicle in the form of the accelerator pedal operation amount Acc, on the basis of the various input signals. Then, the control flow goes to SA40 corresponding to the electric motor torque calculating portion 72, to calculate the first electric motor torque Tmg1st and the second electric motor torque Tmg2st required to generate the engine starting torque Tst, on the basis of the actual cooling water temperature THeng and according to the cold-state electric motor torque map indicated in FIG. 5 by way of example. Further, the first electric motor torque Tmg1st and the second electric motor torque Tmg2st required to generate the engine starting torque Tst are calculated in SA40, on the basis of the actual accelerator pedal operation amount Acc and according to the acceleration-required electric motor torque map indicated in FIG. 6 by way of example. Then, the electric motor torque values Tmgst required for starting the engine 12 are determined to be a larger one of the values of the first electric motor torque Tmg1st, which values have been respectively calculated on the basis of the actual cooling water temperature THeng and the actual accelerator pedal operation amount Acc, and a larger one of the values of the second electric motor torque Tmg2st, which values have been respectively calculated on the basis of the actual cooling water temperature THeng and the actual accelerator pedal operation amount Acc. The control flow then goes to SA50 corresponding to the torque capacity calculating portion 74, to calculate the LU torque capacity Tlu on the basis of the second electric motor torque Tmg2st determined in SA40 and according to the LU torque capacity map of FIG. 7, where the shift lever is placed in the position "N" or "P" or where the automatic transmission 18 is placed in the power cutoff state while the vehicle is stationary with the shift lever being placed in any operating position other than the positions "N" and "P", for example. Alternatively, the LU torque capacity Tlu is calculated on the basis of the automatic transmission torque capacity Tat in the restricted power transmitting state of the automatic transmission 18 and according to the restricted-power-transmission lock-up clutch torque capacity map of FIG. 8, where the automatic transmission 18 is placed in the restricted power transmitting state while the vehicle is actually running at a given running speed V in the motor chive mode with the shift lever being placed in any operating position other than the positions "N" and "P".

Referring to FIG. 10, upon initiation of the engine starting control (at a point of time t1 indicated in FIG. 10) as a result of the determination of the requirement for starting of the engine 12 while the engine 12 is at rest, the first electric motor torque Tmg1st and the second electric motor torque Tmg2st for starting the engine 12 are determined, and the LU torque capacity Tlu is determined on the basis of the determined second electric motor torque Tmg2st. Then, the lock-up clutch LC is placed in a partially engaged state (during a time period from the point of time t1 to a point of time t4 indicated in FIG. 10) such that the lock-up clutch LC is given the determined LU torque capacity Tlu, and the above-indicated first electric motor torque Tmg1st and second electric motor torque Tmg2st are generated (during a time period from a point of time t2 to the point of time t4 indicated in FIG. 10). As a result, the second electric motor torque Tmg2st in addition to the first electric motor torque Tmg1st is transmitted to the crankshaft 14 (during the time period from the point of time t2 to the point of time t4 indicated in FIG. 10), so that the crankshaft 14 is rotated to raise the engine speed Ne. When the engine 12 is operable by itself with its ignition, the first electric motor torque Tmg1, second electric motor torque Tmg2 and LU torque capacity Tlu are reduced (during a time period from the point of time t4 to a point of time t5 indicated in FIG. 10).

Referring to FIG. 11, upon initiation of the engine starting control (at a point of time t1 indicated in FIG. 11) as a result of the determination of the requirement for starting of the engine 12 while the engine 12 is at rest, the first electric motor torque Tmg1st and the second electric motor torque Tmg2st for starting the engine 12 are determined, and the engine starting automatic transmission torque capacity Tat that permits the second electric motor torque Tmg2 prior to the initiation of the engine starting control to be transmitted to the drive wheels 26 during starting of the engine 12 is calculated. This engine starting automatic transmission torque capacity Tat is the torque capacity Tat for maintaining the vehicle acceleration value G prior to the engine starting control, even while the engine is being started. The shock due to the engine starting is more likely to be transmitted when this engine starting automatic transmission torque capacity Tat is relatively large. For reducing the shock, the LU torque capacity Tlu is determined on the basis of the engine starting automatic transmission torque capacity Tat. When the automatic transmission 18 is placed in any one of the first speed gear position ("1st") through the fourth speed gear position ("4th"), for instance, the automatic transmission torque capacity Tat is reduced to the above-indicated engine starting value Tat by reducing a torque capacity of the C1 (during a time period from the point of time t1 to a point of time t5 indicated in FIG. 11). The lock-up clutch LC is placed in a partially engaged state such that the lock-up clutch LC is given the determined LU torque capacity Tlu, and the above-indicated first electric motor torque Tmg1st and second electric motor torque Tmg (=Tmg2st+Tmg2) prior to the engine starting) are generated (during a time period from a point of time t3 to the point of time t5 indicated in FIG. 11). As a result, the second electric motor torque Tmg2st (which is reduced by a fluid loss if the lock-up clutch LC is in a slipping state) in addition to the first electric motor torque Tmg1st is transmitted to the crankshaft 14 (during the time period from the point of time t3 to the point of time t5 indicated in FIG. 11), so that the crankshaft 14 is driven and the engine speed Ne is raised. When the engine 12 is operable by itself with its ignition, the first electric motor torque Tmg1, second electric motor torque Tmg2 and LU torque capacity Tlu are reduced while the torque capacity of the clutch C1 is increased (during a time period from the point of time t5 to a point of time t6 indicated in FIG. 11).

The present embodiment described above is configured such that the first electric motor MG1 and the second electric motor MG2 are controlled to generate the engine starting torque Tst for starting the engine 12 while the lock-up clutch LC is given the LU torque capacity Tlu. Namely, the present embodiment is configured to permit the engine 12 to be started by the first electric motor MG1 and the second electric motor MG2, that is, to use both of the first and second electric motors MG1 and MG2 to generate the engine starting torque Tst for starting the engine 12, so that the required size of each of the two electric motors MG (first and second electric motors MG1 and MG2) can be made smaller than where only one electric motor (the first electric motor MG1 or the second electric motor MG2) is used to start the engine 12. Thus, it is not necessary to increase the size of each of the two electric motors MG, namely, it is possible to prevent an increase of the required sizes of the electric motors MG used to start the engine 12.

The present embodiment is further configured such that the LU torque capacity Tlu of the lock-up clutch LC is increased with an increase of the second electric motor torque Tmg2st, to prevent a slipping action of the lock-up clutch LC while the lock-up clutch LC is given the LU torque capacity Tlu. Accordingly, the second electric motor torque Tmg2st is transmitted to the engine 12 without the slipping action of the lock-up clutch LC, even when the lock-up clutch LC is not placed in its fully engaged state. Therefore, the engine 12 can be efficiently cranked.

The present embodiment is also configured such that the lock-up clutch LC is given the LU torque capacity Tlu while the automatic transmission 18 is placed in the power cutoff state or restricted power transmitting state, and the LU torque capacity Tlu is reduced with an increase of the automatic transmission torque capacity Tat while the automatic transmission 18 is placed in the restricted power transmitting state. Accordingly, the second electric motor speed Nmg2 can be changed without an influence of the rotating speeds of the drive wheels 26 while the lock-up clutch LC is given the LU torque capacity Tlu. Further, it is possible to maintain the acceleration value G of the vehicle which is running while the automatic transmission 18 is placed in the restricted power transmitting state. In this respect, it is noted that a shock caused by starting of the engine 12 is more likely to be transmitted to the drive wheels 26 when the automatic transmission torque capacity Tat is relatively large. However, the degree of transmission of this shock can be reduced by reducing the LU torque capacity Tlu.

Another embodiment of the present invention will be described. It is to be understood that the same reference signs will be used to identify the same elements in the different embodiments, which will not be described redundantly.

Second Embodiment

The first embodiment described above is configured to control the first electric motor MG1 and the second electric motor MG2 to generate the engine starting torque Tst for starting the engine 12 in a cold state, for thereby reducing the required sizes of the first and second electric motors MG1 and MG2. On the other hand, the preset second embodiment, which has the same configuration as the first embodiment, is further configured such that a sum of the upper limits of the torque values of the first and second electric motors MG1 and MG2 is not sufficient to provide an entirety of the engine starting torque Tst required for starting of the engine 12 when the engine 12 is in an extremely cold state, so that the required sizes of the first and second electric motors MG1 and MG2 can be further reduced. A torque corresponding to an amount of shortage of the sum of the upper limits of the torque values of the first and second electric motors MG1 and MG2 with respect to the required engine starting torque Tst in the extremely cold state is provided by an energy of the second electric motor MG2 corresponding to the amount of shortage, which is stored before an engaging action of the lock-up clutch LC and which is discharged during the engaging action of the lock-up clutch LC.

Figure 12:
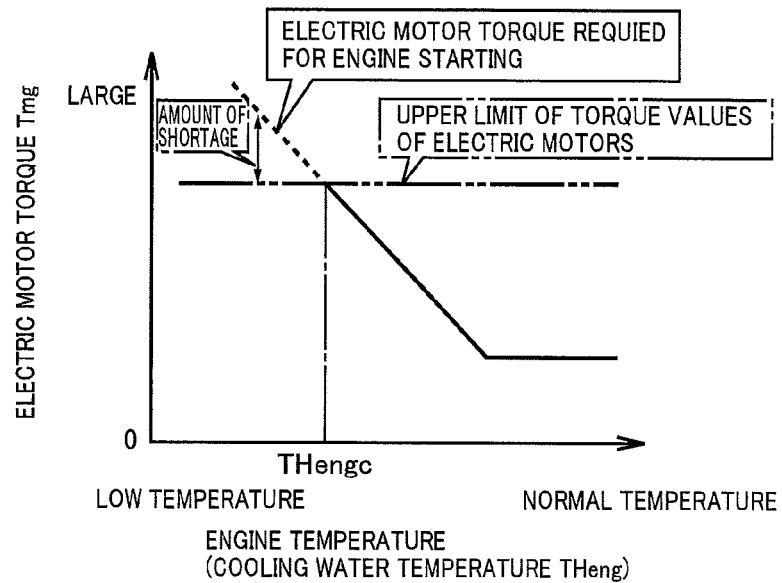
FIG. 12 is a view for explaining a case where the electric motor torque required to start the engine exceeds the largest torque that can be generated by the electric motor.

Described more specifically referring to FIG. 4, the hybrid control portion 70 determines whether a total upper limit torque Tmgmax of the electric motors MG (first and second electric motors MG1 and MG2) is insufficient to provide the electric motor torque Tmgst for starting the engine 12, or not, upon determination of the above-indicated requirement for starting of the engine 12. In an example of FIG. 12, the electric motor torque Tmgst for starting the engine 12 required for starting of the engine 12 in an extremely cold state while the cooling water temperature THeng is lower than a lower limit value THengc is larger than the total upper limit torque Tmgmax, so that a shortage amount is an amount for which the electric motor torque Tmgst for starting the engine 12 exceeds the total upper limit torque Tmgmax. Like the preceding embodiment, the present second embodiment is configured to calculate the first electric motor torque Tmg1st and the second electric motor torque Tmg2st that are required to start the engine 12, according to the cold-state electric motor torque map of FIG. 5, so that the amount of substantial shortage of the electric motor torque Tmgst for starting the engine 12 is equal to a difference of the upper limit torque value Tmg2max from the calculated second electric motor torque Tmg2st required for starting of the engine 12 (namely, the torque shortage amount Tmg2sh=Tmg2st−Tmg2max).

Figure 13:
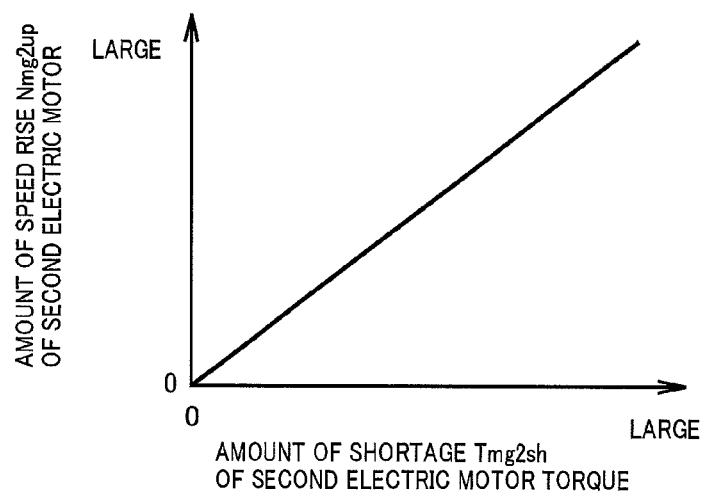
FIG. 13 is a view indicating an example of a memory-stored electric motor speed raising map predetermined to raise an operating speed of a second electric motor speed such that an amount of rise of the operating speed of the second electric motor increases with an increase of an amount of shortage of the torque of the second electric motor.

If the hybrid control portion 70 determines that the total upper limit torque Tmgmax of the electric motors MG is insufficient to provide the electric motor torque Tmgst for starting the engine 12, the hybrid control portion 70 temporarily raises the second electric motor speed Nmg2 in the power cutoff state or restricted power transmitting state of the automatic transmission 18, before the lock-up clutch LC is given the LU torque capacity Tlu. The hybrid control portion 70 calculates an amount Nmg2up of a temporary rise of the second electric motor speed Nmg2 on the basis of the amount of shortage Tmg2sh of the second electric motor torque, and according to a relationship of FIG. 13. This relationship of FIG. 13 is a memory-stored electric motor speed raising map predetermined such that the second electric motor speed rise amount Nmg2up increases with an increase of the second electric motor torque shortage amount Tmg2sh, so that the predetermined amount of energy is stored as the second electric motor torque Tmg2 before cranking of the engine 12, which amount of energy corresponds to an amount of shortage of energy used to crank the engine 12 (amount of shortage of energy almost equal to amount of torque shortage Tmg2sh×cranking speed×cranking time). The stored amount of energy is discharged as an inertia energy during cranking of the engine 12. As described with respect to the first embodiment, the second electric motor speed Nmg2 is influenced by the rotating speeds of the drive wheels 26 in the power transmitting state of the automatic transmission 18, the torque capacity control portion 76 controls the automatic transmission 18 if it is placed in the power transmitting state, such that the automatic transmission 18 is brought into the power cutoff or restricted power transmitting state.

Figure 14:
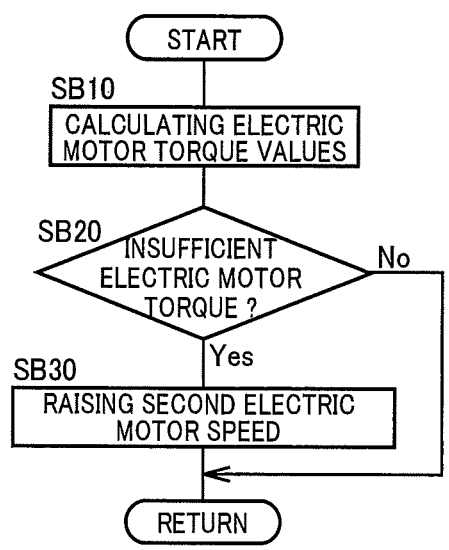
FIG. 14 is a flow chart illustrating a major control operation of the electronic control device, namely, a control operation which makes it possible to more effectively prevent the increase of the required sizes of the engine starter electric motors.
Figure 15:
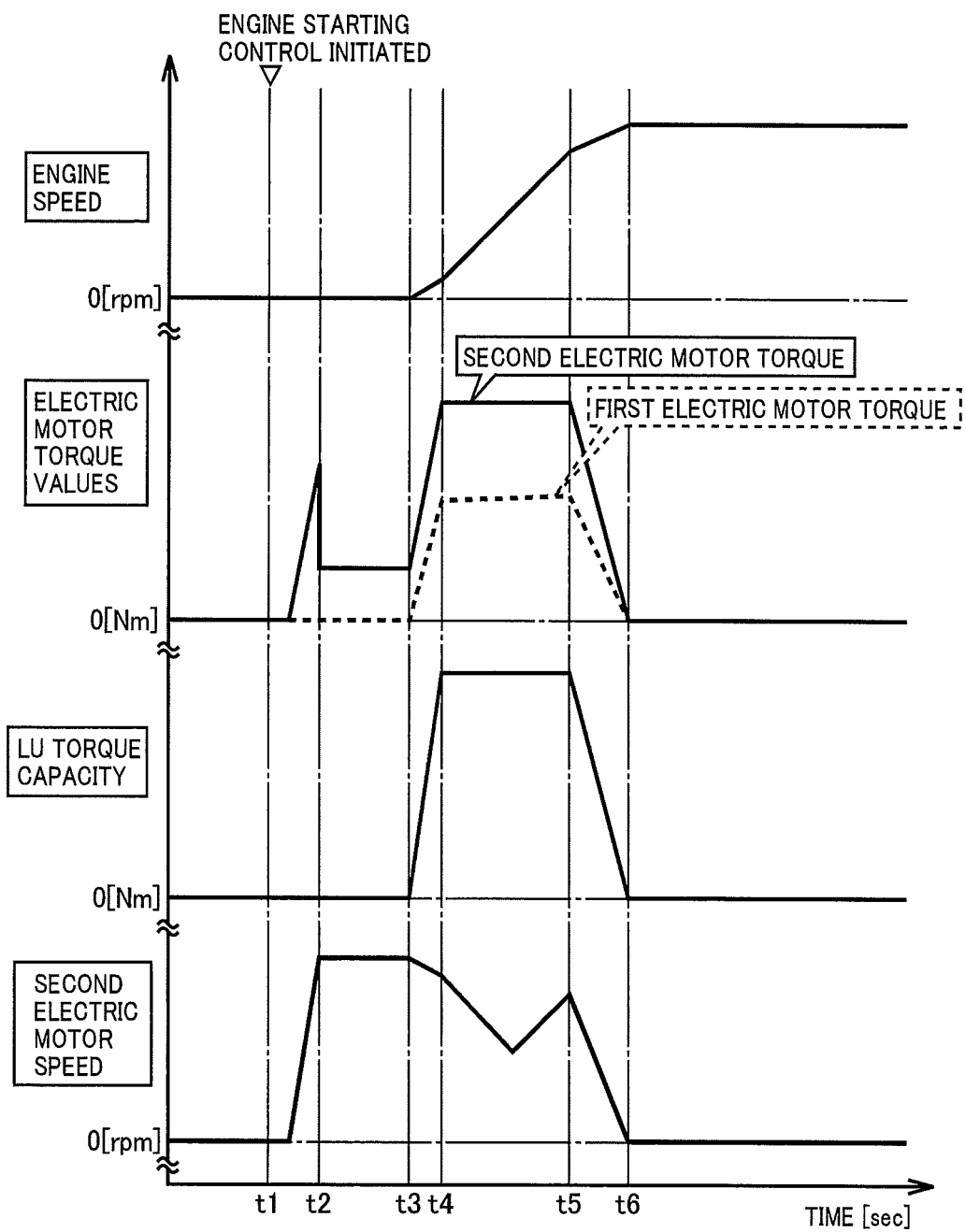
FIG. 15 is a time chart indicating an example of the control operation illustrated in the flow chart of FIG. 14, which is performed when the engine is started while the vehicle is stationary.

FIG. 14 is the flow chart illustrating a major control operation of the electronic control device 40, namely, a control operation which makes it possible to more effectively prevent an increase of the required sizes of the electric motors MG used to start the engine 12. This control operation is repeatedly performed with an extremely short cycle time from several milliseconds to several tens of milliseconds. The control operation of FIG. 14 is performed in addition to the control operation of FIG. 9. For instance, SB10 of FIG. 14 corresponds to SA40 of FIG. 9, and SB20 and SB30 are implemented following SA50 of FIG. 9 and before the lock-up clutch LC is given the LU torque capacity Tlu. FIG. 15 is the time chart indicating an example of the control operation illustrated in the flow chart of FIG. 14, which is performed when the engine 12 is started while the vehicle is stationary.

The control operation of FIG. 14 is initiated with SB10 corresponding to the electric motor torque calculating portion 72, to determine the electric motor torque values Tmgst (first electric motor torque Tmg1*st* and second electric motor torque Tmg2*st*) required for starting of the engine 12, according to the relationships of FIGS. 5 and 6. Then, the control flow goes to SB20 corresponding to the hybrid control portion 70, to determine whether the upper limit torque value Tmg2*max* is insufficient to provide the required engine starting second electric motor torque Tmg2*st* determined in the above-described SB10. If a negative determination is obtained in SB20, the present control routine is terminated. If an affirmative determination is obtained in SB20, the control flow goes to SB30 corresponding to the hybrid control portion 70, to calculate the second electric motor speed rise amount Nmg2*up* on the basis of the second electric motor torque shortage amount Tmg2*sh* (=Tmg2*st*−Tmg2*max*), and according to the relationship of FIG. 13. Then, before the lock-up clutch LC is given the LU torque capacity Tlu, the second electric motor speed Nmg2 is temporarily raised at a given value of the second electric motor torque Tmg2, while the automatic transmission 18 is placed in the power cutoff or restricted power transmitting state.

Referring to FIG. 15, upon initiation of the engine starting control (at a point of time t1 indicated in FIG. 15) as a result of the determination of the requirement for starting of the engine 12 while the engine 12 is at rest, the first electric motor torque Tmg1*st* and the second electric motor torque Tmg2*st* for starting the engine 12 are determined, and the LU torque capacity Tlu is determined on the basis of the determined second electric motor torque Tmg2*st*. If it is determined at this time that the upper limit torque value Tmg2*max* is insufficient to provide the determined second electric motor torque Tmg2*st*, the second electric motor speed rise amount Nmg2*up* is calculated on the basis of the second electric motor torque shortage amount Tmg2*sh*. Then, the second electric motor speed Nmg2 is raised (during a time period from the point of time t1 to a point of time t3 indicated in FIG. 15) at a given value of the second electric motor torque Tmg2. After the second electric motor speed Nmg2 is raised to the second electric motor speed Nmg2, the lock-up clutch LC is brought into a partially engaged state to give the LU torque capacity Tlu, and the above-indicated first electric motor torque Tmg1*st* and the above-indicated second electric motor torque Tmg2*st* (substantially equal to the upper limit value Tmg2*max*) are generated (during a time period from the point of time t3 to a point of time t5 indicated in FIG. 15). As a result, the inertia energy stored by the second electric motor MG2 and the second electric motor torque Tmg2*max* in addition to the first electric motor torque Tmg1*st* are transmitted to the crankshaft 14, so that the crankshaft 14 is rotated so as to raise the engine speed Ne (during the time period from the point of time t3 to the point of time t5 indicated in FIG. 15). When the engine 12 is operable by itself with its ignition, the first electric motor torque Tmg1, second electric motor torque Tmg2 and LU torque capacity Tlu are reduced (during a time period from the point of time t5 to a point of time t6 indicated in FIG. 15).

The present second embodiment described above is configured such that the second electric motor speed Nmg2 is temporarily raised while the automatic transmission 18 is placed in the power cutoff state or restricted power transmitting state, and before the lock-up clutch LC is given the LU torque capacity Tlu. Accordingly, the engine 12 can be started with an aid of the inertia energy of the second electric motor MG2 which has been stored before the lock-up clutch LC is given the LU torque capacity Tlu and which is discharged when the lock-up clutch LC is given the LU torque capacity Tlu. Accordingly, the required sizes of the electric motors MG used to start the engine 12 can be further reduced.

While the embodiments of this invention have been described in detail by reference to the drawings, it is to be understood that the illustrated embodiments may be combined together, and that the invention may be otherwise embodied.

In the illustrated embodiments, a torque pulsation generated during starting of the engine 12 may be transmitted to the drive wheels 26, for instance. This torque pulsation (for example, the pulsation generated due to a compression reaction of the engine 12 being started, from a moment of initiation of cranking to raise the engine speed to a moment just after the complete explosion) can be damped by controlling the electric motors MG so as to generate a torque which offsets the torque pulsation. In view of the above, the electronic control device 40 is configured to use the first electric motor torque Tmg1 for damping the torque pulsation of the crankshaft 14 during starting of the engine 12, and to use the second electric motor torque Tmg2 for damping a torque pulsation in the power transmitting path between the torque converter 16 and the drive wheels 26 during starting of the engine 12. Accordingly, vibrations of the vehicle body can be damped by using the first electric motor MG1 and the second electric motor MG2, namely, by using both of the first and second electric motors MG1 and MG2 to generate a compensating torque for damping the vehicle body vibrations. Accordingly, the required size of each of the electric motors MG can be made smaller than in the case where the vehicle body vibrations are damped by using only one electric motor. That is, it is not necessary to increase the size of each of the two electric motors MG for damping the vehicle body vibrations, and it is possible to prevent an increase of the required size of the electric motors MG used to damp the vehicle body vibrations.

A range of the operating speed of the engine 12 during cranking of the engine 12 may include a resonance band in which resonance is relatively likely to take place due to a rotary motion pulsation of the engine 12. In this resonance band, the above-indicated vehicle body vibrations tend to have a large amplitude. In view of the above, the electronic control device 40 is configured such that the torque Tmgst of at least one of the first electric motor torque Tmg1*st* and the second electric motor torque Tmg2*st* during starting of the engine 12 is made larger in the above-indicated resonance band of the engine 12, than in a band other than the above-indicated resonance band. Accordingly, the engine 12 can be started by using the first and second electric motors MG1 and MG2, such that the vehicle body vibrations remain, for only a short time, in the resonance band in which the vehicle body vibrations tend to have a large amplitude.

In the illustrated embodiments, the first electric motor torque Tmg1*st* and the second electric motor torque Tmg2*st* upon starting of the engine 12 are determined according to the relationships indicated in FIGS. 5 and 6. However, the use of these relationships is not essential. For instance, it is possible to use relationships which are formulated such that the second electric motor torque Tmg2*st* is constant irrespective of the engine temperature and the accelerator pedal operation amount Acc, while the first electric motor torque Tmg1*st* increases with a decrease of the engine temperature and an increase of the accelerator pedal operation amount Acc. It is also possible to use relationships formulated such that both of the first electric motor torque Tmg1*st* and the second electric motor torque Tmg2*st* increase with a decrease of the engine temperature and an increase of the accelerator pedal operation amount Acc. In essence, the first electric motor torque Tmg1*st* and the second electric motor torque Tmg2*st* may be determined so that the engine starting torque Tst increases with a decrease of the engine temperature and an increase of the accelerator pedal operation amount Acc. Further, the first electric motor MG1 (or the second electric motor MG2) may independently have the first electric motor torque Tmg1*st* (second electric motor torque Tmg2*st*), the maximum value of which is large enough to generate the engine starting torque Tst. The principle of the present invention resides in that the two electric motors MG1 and MG2 disposed on the respective opposite sides of the torque converter 16 are used to generate the engine starting torque Tst required for starting the engine 12. Further, the use of the cooling water temperature THeng as the engine temperature is not essential. For example, the temperature of the engine lubricating oil (engine oil) may be used as the engine temperature. Alternatively, the temperature of the engine 12 per se may be detected directly by a sensor. Further, the use of the accelerator pedal operation amount Acc as the required amount of acceleration of the vehicle is not essential. For instance, a rate of change of the accelerator pedal operation amount Acc may be used as the required amount of acceleration of the vehicle. Alternatively, the required amount of acceleration of the vehicle may be calculated on the basis of the vehicle running speed V and the accelerator pedal operation amount Acc.

In the illustrated embodiments, the lock-up clutch LC is placed in the partially engaged state with the lock-up clutch engagement hydraulic pressure required to give the LU torque capacity Tlu corresponding to the second electric motor torque Tmg2*st*, upon starting of the engine 12 when the shift lever is placed in the position "N" or "P". However, the partial engagement of the lock-up clutch LC is not essential. For instance, the lock-up clutch LC may be placed in its fully engaged state with a predetermined memory-stored maximum lock-up clutch engagement hydraulic pressure. Alternatively, the lock-up clutch LC may be placed in an engaged state or a slipping state with a predetermined memory-stored lock-up clutch engagement hydraulic pressure.

Although the automatic transmission 18 provided in the illustrated embodiments is a step-variable transmission, the automatic transmission 18 may be replaced by a continuously variable transmission (CVT) a speed ratio γat of which is continuously variable.

Figure 16:
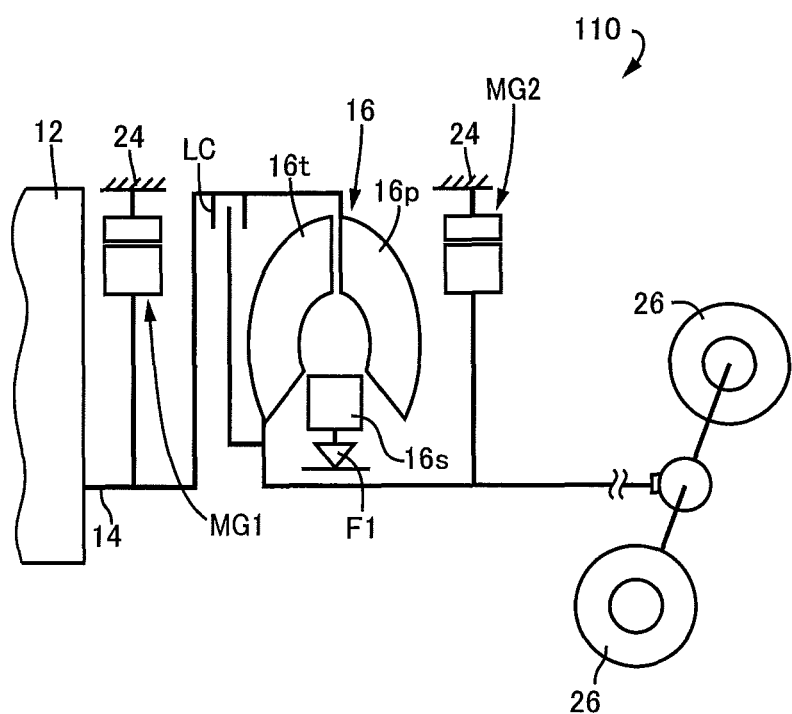
FIG. 16 is a schematic view for explaining another arrangement of a vehicular drive system not provided with an automatic transmission.

The vehicular drive system 10 in the illustrated embodiments is provided with the automatic transmission 18 which is automatically shifted. However, the automatic transmission 18 may be eliminated as in a vehicular drive system 110 shown in FIG. 16. In this case, the power transmitting path between the second electric motor MG2 and the drive wheels 26 is provided with a connecting/disconnecting clutch, which is configured to selectively place the power transmitting path in one of a power transmitting state, a restricted power transmitting state, and a power cutoff state.

In the illustrated embodiments, the second electric motor MG2 is connected directly to the input shaft 20 of the automatic transmission 18 (namely, to the turbine impeller 16*t* of the torque converter 16), as shown in FIG. 1. However, the second electric motor MG2 may be connected to the input shaft 20 indirectly through a transmission, a clutch or a transmission belt. Alternatively, the second electric motor MG2 may be connected to the output gear 22 rather than the input shaft 20. Where the second electric motor MG2 is connected to the output gear 22, the drive wheels 26 are rotated at speeds corresponding to the operating speed of the second electric motor MG2, in the power transmitting state of the power transmitting path therebetween. In this sense, the second electric motor MG2 is considered to be connected directly to the drive wheels 26. Further, the second electric motor MG2 may be a wheel-built-in motor which is built in each of the drive wheels 26. In this case, the two second electric motors MG2 corresponding to the left and right drive wheels 26 are provided.

In the illustrated embodiments, the second electric motor MG2 is connected to the drive wheels 26 which are front wheels connected indirectly to the engine 12, as shown in FIG. 1. However, the illustrated embodiments may be modified such that the engine 12 and the first electric motor MG1 are connected to the above-indicated front wheels, as shown in FIG. 1, while the second electric motor MG2 is connected directly or indirectly to rear wheels rather than the above-indicated front wheels. Where the second electric motor MG2 is connected to the rear wheels, the rear wheels are also drive wheels. That is, the vehicle is provided with drive wheels driven with the drive force of the engine 12, and other drive wheels driven with the drive force of the second electric motor MG2. When the engine is started while this vehicle is stationary, the engine starting second electric motor torque Tmg2*st* generated from the second electric motor MG2 while the corresponding drive wheels are rotated by the second electric motor MG2 is transmitted to the engine 12 while the automatic transmission 18 is placed in the restricted power transmitting state or the power transmitting state.

In the embodiment illustrated in FIG. 1, the first electric motor MG1 is connected directly to the pump impeller 16*p* of the torque converter 16. However, the first electric motor MG1 may be connected to the pump impeller 16*p* indirectly through a transmission, a clutch or a transmission belt.

In the illustrated embodiments, each of the vehicular drive systems 10, 110 is provided with the fluid-operated power transmitting device in the form of the torque converter 16. However, the torque converter 16 may be replaced by a fluid coupling not having a torque boosting function.

It is to be understood that the foregoing description is provided for illustrative purpose only, and that the present invention may be embodied with various other changes and improvements not illustrated herein, which may occur to those skilled in the art, without departing from the spirit and scope of the invention.

NOMENCLATURE OF REFERENCE SIGNS 10, 110: Vehicular drive system
12: Engine
16: Torque converter (Fluid-operated power transmitting device)
16*p*: Pump impeller (Input rotary member)
16*t*: Turbine impeller (Output rotary member)
26: Drive wheels
40: Electronic control device (Control apparatus)
LC: Lock-up clutch
MG1: First electric motor
MG2: Second electric motor

The invention claimed is:

1. A control apparatus for a vehicular drive system provided with: a fluid-operated power transmitting device having an input rotary member configured to receive a drive force from an engine, an output rotary member from which the drive force is transmitted to drive wheels, and a lock-up clutch configured to mechanically connect the input rotary member and the output rotary member to each other; a first electric motor connected directly or indirectly to said input rotary member; and a second electric motor connected directly or indirectly to a power transmitting path between the output rotary member and said drive wheels, and further connected to the engine through the lock-up clutch configured to be placed in a selected one of at least an engaged state and a released state, the control apparatus comprising:

a hybrid control portion configured to control said first electric motor and said second electric motor to generate an engine starting torque for starting said engine while a power transmitting path between said second electric motor and said drive wheels is placed in a power cutoff state or a restricted power transmitting state and while said lock-up clutch is given a torque capacity.

2. The control apparatus according to claim 1, wherein said hybrid control portion temporarily raises an operating speed of said second electric motor is temporarily raised while the power transmitting path between said second electric motor and said drive wheels is placed in the power cutoff state or the restricted power transmitting state, and before said lock-up clutch is given the torque capacity.

3. The control apparatus according to claim 1 further comprising a torque capacity control portion configured to increase said torque capacity of said lock-up clutch with an increase of an output torque of said second electric motor, to prevent a slipping action of said lock-up clutch while said lock-up clutch is given the torque capacity.

4. The control apparatus according to claim 3, wherein said torque capacity control portion reduces a torque capacity the torque capacity of said lock-up clutch with an increase of a torque capacity of said power transmitting path between said second electric motor and said drive wheels, while the power transmitting path between the second electric motor and the drive wheels is placed in the restricted power transmitting state when said lock-up clutch is given the torque capacity.

5. The control apparatus according to claim 1, wherein said hybrid control portion uses a torque of said first electric motor to damp a torque pulsation of a crankshaft of said engine during starting of said engine, and a torque of said second electric motor to damp a torque pulsation in a power transmitting path between said fluid-operated power transmitting device and said drive wheels during starting of said engine.

\* \* \* \* \*